(12) United States Patent
Chang et al.

(10) Patent No.: US 7,783,606 B2
(45) Date of Patent: Aug. 24, 2010

(54) METHOD AND SYSTEM FOR REMOTE DATA RECOVERY

(75) Inventors: Yafen Peggy Chang, Sunnyvale, CA (US); Roger Keith Stager, Sunnyvale, CA (US); Craig Johnston, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 203 days.

(21) Appl. No.: 11/413,327

(22) Filed: Apr. 28, 2006

(65) Prior Publication Data

US 2006/0195493 A1   Aug. 31, 2006

Related U.S. Application Data

(63) Continuation-in-part of application No. 11/051,793, filed on Feb. 4, 2005, now Pat. No. 7,490,103.

(60) Provisional application No. 60/542,011, filed on Feb. 5, 2004, provisional application No. 60/541,626, filed on Feb. 4, 2004.

(51) Int. Cl.
  *G06F 7/00* (2006.01)
  *G06F 17/00* (2006.01)
(52) U.S. Cl. .................. 707/657; 707/623; 707/639
(58) Field of Classification Search .................. None
  See application file for complete search history.

(56) References Cited

U.S. PATENT DOCUMENTS

| | | | |
|---|---|---|---|
| 4,635,145 A | | 1/1987 | Horie et al. |
| 4,727,512 A | | 2/1988 | Birkner et al. |
| 4,775,969 A | | 10/1988 | Osterlund |
| 5,163,148 A | * | 11/1992 | Walls .................. 707/204 |
| 5,235,695 A | | 8/1993 | Pence |
| 5,269,022 A | | 12/1993 | Shinjo et al. |
| 5,297,124 A | | 3/1994 | Plotkin et al. |
| 5,408,470 A | * | 4/1995 | Rothrock et al. ............ 370/261 |
| 5,438,674 A | | 8/1995 | Keele et al. |

(Continued)

FOREIGN PATENT DOCUMENTS

CA   2 256 934 A1   6/2000

(Continued)

OTHER PUBLICATIONS

"Alacritus Software's Securitus I: Pointing the Way to Virtual Tape Libraries" Aberdeen Group, Inc., Mar. 2002.

(Continued)

*Primary Examiner*—Pierre M Vital
*Assistant Examiner*—Augustine Obisesan
(74) *Attorney, Agent, or Firm*—Perkins Coie LLP (57) ABSTRACT

A method and system for generating a snapshot in a consistent state is disclosed. The system comprises a host computer, a primary data storage, a data protection unit, and a secondary data storage. The data protection unit monitors a state of an email application which is running on the host computer. The data protection unit generates a snapshot of data stored in a primary data storage when the email application is in a consistent state, and stores the snapshot on a secondary storage. In the event of a system failure, the data is recovered using the last snapshot. A method and system for recovering email data from a snapshot in a consistent state using a client is also disclosed.

21 Claims, 6 Drawing Sheets

U.S. PATENT DOCUMENTS

| | | | |
|---|---|---|---|
| 5,455,926 A | 10/1995 | Keele et al. | |
| 5,485,321 A | 1/1996 | Leonhardt et al. | |
| 5,555,371 A * | 9/1996 | Duyanovich et al. | 714/13 |
| 5,638,509 A * | 6/1997 | Dunphy et al. | 714/20 |
| 5,666,538 A | 9/1997 | DeNicola | |
| 5,673,382 A | 9/1997 | Cannon et al. | |
| 5,774,292 A | 6/1998 | Georgiou et al. | |
| 5,774,643 A | 6/1998 | Lubbers et al. | |
| 5,774,715 A | 6/1998 | Madany et al. | |
| 5,805,864 A | 9/1998 | Carlson et al. | |
| 5,809,511 A | 9/1998 | Peake | |
| 5,809,543 A | 9/1998 | Byers et al. | |
| 5,835,953 A * | 11/1998 | Ohran | 711/162 |
| 5,854,720 A | 12/1998 | Shrinkle et al. | |
| 5,857,208 A | 1/1999 | Ofek | |
| 5,864,346 A | 1/1999 | Yokoi et al. | |
| 5,872,669 A | 2/1999 | Morehouse et al. | |
| 5,875,479 A | 2/1999 | Blount et al. | |
| 5,911,779 A | 6/1999 | Stallmo et al. | |
| 5,949,970 A | 9/1999 | Sipple et al. | |
| 5,961,613 A | 10/1999 | DeNicola | |
| 5,963,971 A | 10/1999 | Fosler et al. | |
| 5,974,424 A | 10/1999 | Schmuck et al. | |
| 6,021,408 A | 2/2000 | Ledain et al. | |
| 6,023,709 A | 2/2000 | Anglin et al. | |
| 6,029,179 A | 2/2000 | Kishi | |
| 6,041,329 A | 3/2000 | Kishi | |
| 6,044,442 A | 3/2000 | Jesionowski | |
| 6,049,848 A | 4/2000 | Yates et al. | |
| 6,061,309 A | 5/2000 | Gallo et al. | |
| 6,067,587 A | 5/2000 | Miller et al. | |
| 6,070,224 A | 5/2000 | LeCrone et al. | |
| 6,098,148 A | 8/2000 | Carlson | |
| 6,128,698 A | 10/2000 | Georgis | |
| 6,131,142 A | 10/2000 | Kamo et al. | |
| 6,131,148 A | 10/2000 | West et al. | |
| 6,134,660 A | 10/2000 | Boneh et al. | |
| 6,163,856 A | 12/2000 | Dion et al. | |
| 6,173,293 B1 | 1/2001 | Thekkath et al. | |
| 6,173,359 B1 | 1/2001 | Carlson et al. | |
| 6,195,730 B1 | 2/2001 | West | |
| 6,225,709 B1 | 5/2001 | Nakajima | |
| 6,247,096 B1 | 6/2001 | Fisher et al. | |
| 6,260,110 B1 | 7/2001 | LeCrone et al. | |
| 6,266,784 B1 | 7/2001 | Hsiao et al. | |
| 6,269,423 B1 | 7/2001 | Kishi | |
| 6,269,431 B1 | 7/2001 | Dunham | |
| 6,282,609 B1 | 8/2001 | Carlson | |
| 6,289,425 B1 | 9/2001 | Blendermann et al. | |
| 6,292,889 B1 | 9/2001 | Fitzgerald et al. | |
| 6,301,677 B1 | 10/2001 | Squibb | |
| 6,304,880 B1 | 10/2001 | Kishi | |
| 6,317,814 B1 | 11/2001 | Blendermann et al. | |
| 6,324,497 B1 | 11/2001 | Yates et al. | |
| 6,327,418 B1 | 12/2001 | Barton | |
| 6,336,163 B1 | 1/2002 | Brewer et al. | |
| 6,336,173 B1 | 1/2002 | Day et al. | |
| 6,339,778 B1 | 1/2002 | Kishi | |
| 6,341,329 B1 | 1/2002 | LeCrone et al. | |
| 6,343,342 B1 | 1/2002 | Carlson | |
| 6,353,837 B1 | 3/2002 | Blumenau | |
| 6,360,232 B1 | 3/2002 | Brewer et al. | |
| 6,389,503 B1 | 5/2002 | Georgis et al. | |
| 6,397,307 B2 | 5/2002 | Ohran | |
| 6,408,359 B1 | 6/2002 | Ito et al. | |
| 6,487,561 B1 | 11/2002 | Ofek et al. | |
| 6,496,791 B1 | 12/2002 | Yates et al. | |
| 6,499,026 B1 | 12/2002 | Rivette et al. | |
| 6,557,073 B1 | 4/2003 | Fujiwara | |
| 6,557,089 B1 | 4/2003 | Reed et al. | |
| 6,578,120 B1 | 6/2003 | Crockett et al. | |
| 6,615,365 B1 | 9/2003 | Jenevein et al. | |
| 6,625,704 B2 | 9/2003 | Winokur | |
| 6,654,912 B1 | 11/2003 | Viswanathan et al. | |
| 6,658,435 B1 | 12/2003 | McCall | |
| 6,694,447 B1 | 2/2004 | Leach et al. | |
| 6,725,331 B1 | 4/2004 | Kedem | |
| 6,766,520 B1 | 7/2004 | Rieschl et al. | |
| 6,779,057 B2 | 8/2004 | Masters et al. | |
| 6,779,058 B2 | 8/2004 | Kishi et al. | |
| 6,779,081 B2 | 8/2004 | Arakawa et al. | |
| 6,816,941 B1 | 11/2004 | Carlson et al. | |
| 6,816,942 B2 | 11/2004 | Okada et al. | |
| 6,834,324 B1 | 12/2004 | Wood | |
| 6,850,964 B1 | 2/2005 | Brough et al. | |
| 6,877,016 B1 * | 4/2005 | Hart et al. | 707/201 |
| 6,898,600 B2 | 5/2005 | Fruchtman et al. | |
| 6,915,397 B2 | 7/2005 | Lubbers et al. | |
| 6,931,557 B2 | 8/2005 | Togawa | |
| 6,950,263 B2 | 9/2005 | Suzuki et al. | |
| 6,973,369 B2 | 12/2005 | Trimmer et al. | |
| 6,973,534 B2 | 12/2005 | Dawson | |
| 6,978,283 B1 | 12/2005 | Edwards et al. | |
| 6,978,325 B2 | 12/2005 | Gibble | |
| 7,007,043 B2 | 2/2006 | Farmer et al. | |
| 7,020,779 B1 | 3/2006 | Sutherland | |
| 7,032,126 B2 | 4/2006 | Zalewski et al. | |
| 7,055,009 B2 | 5/2006 | Factor et al. | |
| 7,072,910 B2 | 7/2006 | Kahn et al. | |
| 7,096,331 B1 | 8/2006 | Haase et al. | |
| 7,100,089 B1 | 8/2006 | Phelps | |
| 7,111,136 B2 | 9/2006 | Yamagami | |
| 7,111,194 B1 | 9/2006 | Schoenthal et al. | |
| 7,127,388 B2 | 10/2006 | Yates et al. | |
| 7,127,577 B2 | 10/2006 | Koning | |
| 7,152,077 B2 | 12/2006 | Veitch et al. | |
| 7,152,078 B2 | 12/2006 | Yamagami | |
| 7,155,465 B2 | 12/2006 | Lee et al. | |
| 7,155,586 B1 | 12/2006 | Wagner et al. | |
| 7,200,726 B1 | 4/2007 | Gole et al. | |
| 7,203,726 B2 | 4/2007 | Hasegawa et al. | |
| 7,251,713 B1 | 7/2007 | Zhang | |
| 7,315,965 B2 | 1/2008 | Stager et al. | |
| 7,325,159 B2 | 1/2008 | Stager et al. | |
| 7,346,623 B2 | 3/2008 | Prahlad et al. | |
| 7,426,488 B1 | 7/2008 | Stager et al. | |
| 7,426,617 B2 | 9/2008 | Stager et al. | |
| 7,490,103 B2 | 2/2009 | Stager et al. | |
| 2001/0047447 A1 | 11/2001 | Katsuda | |
| 2002/0004835 A1 | 1/2002 | Yarbrough | |
| 2002/0016827 A1 | 2/2002 | McCabe et al. | |
| 2002/0026595 A1 | 2/2002 | Saitou et al. | |
| 2002/0091670 A1 * | 7/2002 | Hitz et al. | 707/1 |
| 2002/0095557 A1 | 7/2002 | Constable et al. | |
| 2002/0144057 A1 | 10/2002 | Li et al. | |
| 2002/0163760 A1 | 11/2002 | Lindsey et al. | |
| 2002/0166079 A1 | 11/2002 | Ulrich et al. | |
| 2002/0199129 A1 | 12/2002 | Bohrer et al. | |
| 2003/0004980 A1 | 1/2003 | Kishi et al. | |
| 2003/0005313 A1 | 1/2003 | Gammel et al. | |
| 2003/0037211 A1 | 2/2003 | Winokur | |
| 2003/0046260 A1 | 3/2003 | Satyanarayanan et al. | |
| 2003/0120476 A1 | 6/2003 | Yates et al. | |
| 2003/0120676 A1 | 6/2003 | Holavanahalli et al. | |
| 2003/0126136 A1 * | 7/2003 | Omoigui | 707/10 |
| 2003/0126388 A1 | 7/2003 | Yamagami | |
| 2003/0135672 A1 | 7/2003 | Yip et al. | |
| 2003/0149700 A1 | 8/2003 | Bolt | |
| 2003/0158766 A1 | 8/2003 | Mital et al. | |
| 2003/0182301 A1 | 9/2003 | Patterson et al. | |
| 2003/0182350 A1 | 9/2003 | Dewey | |
| 2003/0188208 A1 | 10/2003 | Fung | |
| 2003/0217077 A1 | 11/2003 | Schwartz et al. | |
| 2003/0225800 A1 | 12/2003 | Kavuri | |

| | | | |
|---|---|---|---|
| 2004/0015731 | A1 | 1/2004 | Chu et al. |
| 2004/0098244 | A1 | 5/2004 | Dailey et al. |
| 2004/0103147 | A1 | 5/2004 | Flesher et al. |
| 2004/0158766 | A1* | 8/2004 | Liccione et al. ............... 714/4 |
| 2004/0167903 | A1 | 8/2004 | Margolus et al. |
| 2004/0168034 | A1 | 8/2004 | Homma et al. |
| 2004/0168057 | A1 | 8/2004 | Margolus et al. |
| 2004/0181388 | A1 | 9/2004 | Yip et al. |
| 2004/0181707 | A1 | 9/2004 | Fujibayashi |
| 2004/0267836 | A1* | 12/2004 | Armangau et al. .......... 707/203 |
| 2005/0010529 | A1 | 1/2005 | Zalewski et al. |
| 2005/0044162 | A1 | 2/2005 | Liang et al. |
| 2005/0063374 | A1 | 3/2005 | Rowan et al. |
| 2005/0065962 | A1 | 3/2005 | Rowan et al. |
| 2005/0066118 | A1 | 3/2005 | Perry et al. |
| 2005/0066222 | A1 | 3/2005 | Rowan et al. |
| 2005/0066225 | A1 | 3/2005 | Rowan et al. |
| 2005/0076264 | A1 | 3/2005 | Rowan et al. |
| 2005/0076070 | A1 | 4/2005 | Mikami |
| 2005/0076261 | A1 | 4/2005 | Rowan et al. |
| 2005/0076262 | A1 | 4/2005 | Rowan et al. |
| 2005/0097260 | A1 | 5/2005 | McGovern et al. |
| 2005/0108302 | A1 | 5/2005 | Rand et al. |
| 2005/0144407 | A1 | 6/2005 | Colgrove et al. |
| 2005/0182910 | A1 | 8/2005 | Stager et al. |
| 2005/0240813 | A1 | 10/2005 | Okada et al. |
| 2006/0005074 | A1* | 1/2006 | Yanai et al. .................... 714/5 |
| 2006/0010177 | A1 | 1/2006 | Kodama |
| 2006/0047895 | A1 | 3/2006 | Rowan et al. |
| 2006/0047902 | A1 | 3/2006 | Passerini |
| 2006/0047903 | A1 | 3/2006 | Passerini |
| 2006/0047905 | A1 | 3/2006 | Matze et al. |
| 2006/0047925 | A1 | 3/2006 | Perry |
| 2006/0047989 | A1 | 3/2006 | Delgado et al. |
| 2006/0047998 | A1 | 3/2006 | Darcy |
| 2006/0047999 | A1 | 3/2006 | Passerini et al. |
| 2006/0143376 | A1 | 6/2006 | Matze et al. |
| 2006/0235907 | A1 | 10/2006 | Kathuria et al. |
| 2006/0259160 | A1 | 11/2006 | Hood et al. |

FOREIGN PATENT DOCUMENTS

| | | |
|---|---|---|
| EP | 0 845 733 A2 | 6/1998 |
| EP | 0 869 460 A2 | 10/1998 |
| EP | 1 058 254 A2 | 12/2000 |
| EP | 1 122 910 A1 | 8/2001 |
| EP | 1 233 414 A2 | 8/2002 |
| EP | 1333379 | 4/2006 |
| EP | 1 671 231 | 6/2006 |
| EP | 1 671231 | 6/2006 |
| WO | WO99/03098 | 1/1999 |
| WO | WO99/06912 | 2/1999 |
| WO | WO-0118633 A1 | 3/2001 |
| WO | WO-03067438 A2 | 8/2003 |
| WO | WO-2004084010 A2 | 9/2004 |
| WO | WO2005/031576 | 4/2005 |
| WO | WO2006/023990 | 3/2006 |
| WO | WO2006/023991 | 3/2006 |
| WO | WO2006/023992 | 3/2006 |
| WO | WO2006/023993 | 3/2006 |
| WO | WO2006/023994 | 3/2006 |
| WO | WO2006/023995 | 3/2006 |

OTHER PUBLICATIONS

"Continuous Data Protection: Business Continuity for the Era of Networked Storage: An Executive White Paper" Aberdeen Group, Inc., Jul. 2003.
"Alacritus Software's Chronospan: Make Time for Continuous Data Protection" Aberdeen Group, Inc., Oct. 2003.
Hill, David "Alacritus Software's Securitus: Defining the Way to Virtual Tape Libraries" Aberdeen Group, Inc., Jul. 2003.
"Alacritus Software's Securitus: Defining the Way to Virtual Tape Libraries" Aberdeen Group, Inc., Jul. 2003.
"Product Brief: Rhapsody/Alacritus-Secritus/XPath Virtual Tape in the Fabric" The Enterprise Storage Group, Aug. 2002.
"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.
"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.
"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alacritus Software, Inc., Oct. 3, 2001.
Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.
"Alacritus Software Announces Virtual Tape Library Support for Legato NetWorker Data Protection Solution" Alacritus Software, Inc., Jan. 8, 2002.
Camphuisen, Alicia, "Hitachi Inks OEM Deal with Legato" Knapp Comm., Jul. 17, 2002.
"Alacritus Announces Disk-Based Successor to Tape" Knapp Comm., Aug. 21, 2002.
Biggar, Heidi, "Alacritus Enables Disk-Based Backup" InfoStor, Sep. 2001.
"Securitus I White Paper: Disk Based Data Protection from Alacritus Software" Alacritus Software, Inc., Jul. 2001.
"Alacritus Software FAQs" Alacritus Software, Inc., Jul. 2001.
"Disk-Based Data Protection" Alacritus Software, Inc., Jul. 2001.
"Virtual Tape Library Technology Brochure" Alacritus Software, Inc., Jul. 2001.
"Disk-Based Data Protection" Alacritus Software, Inc., Sep. 2001.
"Disk-Based Data Protection" Alacritus Software, Inc., Sep. 2002.
Payack, Paul JJ, "Alacritus Lines Up OEM Partners for Virtual Tape Library Push" The (451) Storage & Systems, Oct. 4, 2002.
Payack, Paul JJ, "Alacritus Software Announces Continuous Data Protection with New Chronospan Technology" Oct. 28, 2003.
Payack, Paul JJ, "Alacritus Software Announces New Customers for Securitus VTLA" Alacritus Software, Jan. 13, 2004.
Baltazar, Henry "Weaving Apps Into SAN Fabric" eWEEK, Mar. 24, 2003.
Baltazar, Henry "More Intelligence is on the Way" eWEEK, Sep. 15, 2003.
Barrett, Alex "The Case for Network Smarts" Storage Magazine, Jun. 2003.
"Securitus White Paper: Disk Based Data Protection from Alacritus Software" Alacritus Website, Oct. 2003.
"Manageability: Securitus v. Tape" Alacritus Website, Oct. 2003.
"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.
"No Changes Required: Securitus v. Tape" Alacritus Website, Oct. 2003.
"Customer Success" Alacritus Website, Oct. 2003.
"Chronospan" Alacritus Website, Oct. 2003.
"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.
Biggar, Heidi, "Disk and Tape Forge New Partnership in Backup Arena" InfoStor, Nov. 2001.
Preston, W. Curtis, "Surprise! Cheap Disks Cure Slow Backup" Storage Magazine, Jun. 1, 2002.
"Alacritus, Hitachi CP and Nissho Team to Create Virtual Tape Library" internetnews.com, Jun. 25, 2001.
"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability" Alacritus Software, Jul. 8, 2002.
Komiega, Kevin, "Vendor Pushes Disk Backup Over Tape" SearchStorage.com Jan. 10, 2003.
"Testimonials" Alacritus Website, Oct. 2003.
"Seamless Integration" Alacritus Website, Oct. 2003.
"Topologies" Alacritus Website, Oct. 7, 2003.
"Securitus" Alacritus Website, Oct. 2003.
"Scalability: *Securitus v. Tape*" Alacritus Website, Oct. 2003.
"Strengths: *Securitus v. Tape* " Alacritus Website, Oct. 2003.
"Alacritus Creates 'Next Critical Step' in Disaster Recovery for Patrick Air Force Base, Securitus VTL Sets the Pace", Apr. 20, 2004.
"Alacritus to Demonstrate Chronospan CDP with the Brocade Fabric Application Platform at Storage Networking World", Apr. 1, 2004.
"Alacritus to Demo Chronospan Continuous Data Protection with the Cisco MDS 9000", Apr. 1, 2004.
"Alacritus and Network Appliance Deliver Advanced Virtual Tape Library, Solution Shortens Backup Windows, Accelerates Data Recovery, and Simplifies Backup Management", Dec. 7, 2004.
"Cisco and Storage ISVs to Demo Protocol-Based Interface between Storage Appliances and the Cisco MDS 9000", Mar. 30, 2004.
"Case Study Shizuoka-ken Noukyou Densan Center K.K., Reducing Management Costs Through Tapeless Backup at an iDC", Apr. 7, 2004.
°Disk-Based Data Protection° Alacritus Software, Inc., Sep. 2002.
"Manageability: *Securitus v. Tape*" Alacritus Website, Oct. 2003.
"No Changes Required: *Securitus v. Tape*" Alacritus Website, Oct. 2003.
"Scalability: *Securitus v. Tape*"Alacritus Website, Oct. 2003.
Joan Daemen et al.. "AES Proposal: Rijndael". The Rijndael Block Cipher. Document Version Mar. 2, 1999. 45 pages.
Joan Daemon et al., "Note on Naming", Rijndael, Sep. 4, 2003, 2 pages.
Decru, "Decru Datatort E-Series Storage Security Appliances, Transparent Data Security for Network Attached Storage (NAS)". 2004. 2 pages.
Simon L. Garfinkel et al., "Rememberance of Data Passed: A Study of Disk Sanitization Practices", IEEE Security and Privacy, vol. 1. No. 1. 2003 19 pages.
Hatfield. "Write Read Verity Feature Set". May 14, 2004.
Chris Lueth, "WORM Storage on Magnetic Disks Using Snaplock Compliance™ and Snaplock Enterprise™ ", Network Applicance. Inc.. Sep. 2003. sections 1-5 13 pages.
"Network Appliance WORM Storage Solution: SEC 17 a-4(f) Compliance Assessment", Network Appliance, Inc., Jul. 10, 2003, pp. 1-20.
Novell NetWare Server Disks and Storage Devices Administration Guide. Netware 5.1, Jan. 2000. pp. 1-60.
Co-pending U.S. Appl. No. 10/772,017, filed Feb. 4, 2004.
Non-Final Office Action mailed Jul. 13, 2006 in Co-Pending U.S. Appl. No. 10/772,017, filed Feb. 4, 2004.
Final Office Action mailed Jan. 11, 2007 in Co-Pending U.S. Appl. No. 10/772,017, filed Feb. 4, 2004.
Notice of Allowance mailed Jun. 6, 2007 and Sep. 20, 2007 in Co-Pending U.S. Appl. No. 10/772,017, filed Feb. 4, 2004.
Co-pending U.S. Appl. No. 10/771,613, filed Feb. 4, 2004.
Non-Final Office Action mailed Jul. 14, 2006 in Co-pending U.S. Appl. No. 10/771,613, filed Feb. 4, 2004.
Final Office Action mailed Jan. 11, 2007 in Co-pending U.S. Appl. No. 10/771,613 filed Feb. 4, 2004.
Notice of Allowance mailed Jun. 14, 2007 and Sep. 28, 2007 in Co-pending U.S. Appl. No. 10/771,613, filed Feb. 4, 2004.
Co-pending U.S. Appl. No. 10/772,642, filed Feb. 5, 2004.
Non-Final Office Action mailed Dec. 28, 2006 in Co-pending U.S. Appl. No. 10/772,642, filed Feb. 5, 2004.
Final Office Action mailed Jul. 12, 2007 in Co-pending U.S. Appl. No. 10/772,642, filed Feb. 5, 2004.
Notice of Allowance mailed Nov. 1, 2007 in Co-pending U.S. Appl. No. 10/772,642, filed Feb. 5, 2004.
Co-pending U.S. Appl. No. 10/772,643, filed Feb. 5, 2004.
Non-Final Office Action mailed Jul. 26, 2006 in Co-pending U.S. Appl. No. 10/772,643, filed Feb. 5, 2004.
Final Office Action mailed Jan. 24, 2007 in Co-pending U.S. Appl. No. 10/772,643, filed Feb. 5, 2004.
Non-Final Office Action mailed Jul. 12, 2007 in Co-pending U.S. Appl. No. 10/772,643, filed Feb. 5, 2004.
Notice of Allowance mailed Feb. 21, 2008 in Co-pending U.S. Appl. No. 10/772,643, filed Feb. 5, 2004.
Co-pending U.S. Appl. No. 11/051,793, filed Feb. 4, 2004.
Non-Final Office Action mailed Aug. 24, 2007 in Co-pending U.S. Appl. No. 11/051,793, filed Feb. 4, 2004.
Final Office Action mailed Apr. 24, 2008 in Co-pending U.S. Appl. No. 11/051,793, filed Feb. 4, 2004.
Non-Final Office Action mailed Aug. 15, 2008 in Co-pending U.S. Appl. No. 11/051,793, filed Feb. 4, 2004.
Notiec of Allowance mailed Dec. 11, 2008 in Co-pending U.S. Appl. No. 11/051,793, filed Feb. 4, 2004.
Co-pending U.S. Appl. No. 11/833,515, filed Aug. 3, 2007.
Non-Final Office Action mailed Dec. 1, 2009 in Co-pending U.S. Appl. No. 11/833,515, filed Aug. 3, 2007.
Centered Systems. "Second Copy 7", (1991-2007).

* cited by examiner

METHOD AND SYSTEM FOR REMOTE DATA RECOVERY

CROSS REFERENCE TO RELATED APPLICATIONS

This application is a continuation-in-part of U.S. patent application Ser. No. 11/051,793, filed Feb. 4, 2005 which claims the benefit of U.S. Provisional Application Nos. 60/542,011, filed Feb. 5, 2004 and Ser. No. 60/541,626, filed Feb. 4, 2004 which are incorporated by reference as if fully set forth herein.

FIELD OF INVENTION

The present invention relates to data backup. More particularly, the present invention is a method and system for generating a snapshot in a consistent state and recovering electronic mail, hereinafter "email", data from a snapshot in a consistent state.

BACKGROUND

Many schemes have been developed to protect data from loss or damage. One such scheme is hardware redundancy, such as redundant arrays of independent disks (RAID). Unfortunately, hardware redundancy schemes are ineffective in dealing with logical data loss or corruption. For example, an accidental file deletion or virus infection is automatically replicated to all of the redundant hardware components and can neither be prevented nor recovered from when using such technologies.

To overcome this problem, backup technologies have been developed to retain multiple versions of a production system over time. This allowed administrators to restore previous versions of data and to recover from data corruption.

One type of data protection system involves making point in time (PIT) copies of data. A first type of PIT copy is a hardware-based PIT copy, which is a mirror of a primary volume onto a secondary volume. The main drawbacks of the hardware-based PIT copy are that the data ages quickly and that each copy takes up as much disk space as the primary volume. A software-based PIT, or so called "snapshot," is a "picture" of a volume at the block level or a file system at the operating system level.

It is desirable to generate a snapshot when an application or a file system is in a consistent state because it alleviates the need to replay a log of write streams and allows applications to be restarted rapidly. In order to achieve this, prior art systems suspend an application to update source data and flushes the source data to primary storage before generating a snapshot. However, this method is not efficient because the system has to be suspended for a while in order to generate a snapshot. PIT systems also inefficiently require that the entire snapshot be restored in order to recover specific data. However, it is sometimes desirable to recover a specific file, email data, or the like. This may require recovering a parsed version of a snapshot. For email data, the user may also have to manually set up an email application on top of the recovered snapshot in order to read the recovered email data.

Therefore, there is a need for a method and system for generating a snapshot in a consistent state without suspending an application or a system and for restoring email data from a snapshot in a consistent state.

SUMMARY

The present invention is a method and system for generating a snapshot in a consistent state and recovering email data using a remote client. The system comprises a host computer, primary data storage, a data protection unit, and secondary data storage. The data protection unit monitors a state of an application which is running on the host computer. The data protection unit generates a snapshot of data stored in primary data storage when the application is in a consistent state, and stores the snapshot on secondary storage. In the event of a system failure, the data is recovered using the last snapshot. Snapshot generation may be triggered either by storing data on a secondary storage or marking data that already exists on the secondary storage.

Alternatively, the system may identify a consistent snapshot by analyzing previous write streams. Snapshots are generated in accordance with a snapshot generation policy. In the event of a system failure, the data protection unit identifies a snapshot which is generated in a consistent state among a plurality of snapshots. The data is recovered from the identified snapshot.

The present system may also provide means for recovering email data from a snapshot in a consistent state. The data protection unit may provide interface means for a remote client to access snapshots in a consistent state having email data.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

The present invention will be described with reference to the drawing figures wherein like numerals represent like elements throughout. The present invention may be implemented, purely by way of example, in a Chronospan system, such as is described in U.S. patent application Ser. No. 10/771,613, which is incorporated by reference as if fully set forth.

Figure 1A:
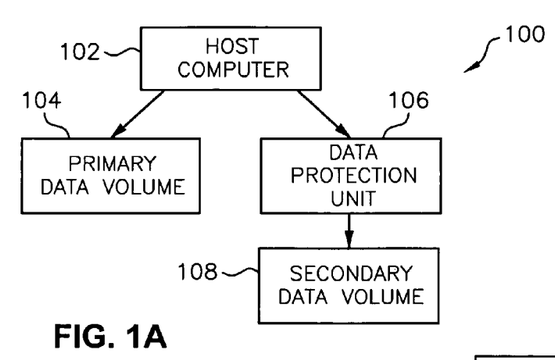
FIGS. 1A-1C are block diagrams of systems for data backup in accordance with the present invention.

FIG. 1A shows a system 100 for data backup in accordance with one embodiment of the present invention. The system 100 comprises a host computer 102, a primary data volume 104 (the primary data volume may also be referred to as the protected volume), a data protection unit 106, and a secondary data volume 108. The host computer 102 is connected directly to the primary data volume 104 and to the data protection unit 106. The data protection unit 106 manages the secondary data volume 108. The configuration of the system 100 minimizes the lag time by writing directly to the primary data volume 104 and permits the data protection unit 106 to focus exclusively on managing the secondary data volume 108. The management of the volumes is preferably performed using a volume manager (not shown).

A volume manager is a software module that runs on the host computer 102 or an intelligent storage switch 142 (see FIG. 1C) to manage storage resources. Typical volume managers have the ability to aggregate blocks from multiple different physical disks into one or more virtual volumes. Applications are not aware that they are actually writing to segments of many different disks because they are presented with one large, contiguous volume. In addition to block aggregation, volume managers usually offer software RAID functionality. For example, they are able to split the segments of the different volumes into two groups, where one group is a mirror of the other group. In this embodiment, the volume manager mirrors the writes to both the primary data volume 104 and the data protection unit 106 for redundancy in case of a hardware failure. Therefore, the volume manager also sends copies of all writes to the data protection unit 106.

The data protection unit 106 controls generation of snapshots. A plurality of snapshots are generated, stored and expired in accordance with a snapshot generation policy. The host computer 102 runs an application. Hereinafter, the terminology "application" means any software running on a computer or a file management system for managing and storing data including, but not limited to, a database system, an email system or a file system. The application running on the host computer 102 generates an output and the output is preferably stored in a memory (not shown) in the host computer. The output in the memory is flushed into the primary data volume 104 when the memory is full or a predetermined time expires or instructed by the application. Alternatively, the output may be directly stored in the primary volume.

The application running on the host computer 102 generates information which may be used in determining whether the application is in a consistent state or not. Various schemes may be used for this purpose. For example, a file system may be configured to generate an indicator that the system is in a consistent state. More particularly, the file system may set specific bits to indicate that the file system is in a clean state. The system reads the specific bit to figure out whether the system is in a consistent state, and generates a snapshot when the bits are set. Alternatively, it is possible to analyze the log of a journaling system to find out a consistent state when the log is empty. A journaling system may be a file system that logs changes to a journal, i.e. a collection of logs, before actually writing them to a main file system. In the event of a system failure, a journaling system ensures that the data on the disk may be restored to its pre-crash configuration.

The data protection unit 106 monitors state information in real time and detects when the application is in a consistent state. The data protection unit 106 generates a snapshot when the application is in a consistent state. With this scheme, in the case of a system failure, the need to replay a log of write streams to recover data is substantially alleviated, and the application may be restarted more rapidly. The snapshots do not have to be absolutely consistent. The snapshots may be generated slightly before or after the consistent point. The snapshots may be generated at any point that may be a good time in practice, (i.e., any time that requires a small time for replaying the log is a good candidate).

The consistent point may vary from application to application. A snapshot that may be consistent for one application may not be consistent for another application. Therefore, after generating one snapshot which is consistent for one application, if a consistent point is detected for another application, another snapshot is generated. In this case, the second snapshot probably does not have many changes.

It is noted that the primary data volume 104 and the secondary data volume 108 can be any type of data storage, including, but not limited to, a single disk, a disk array (such as a RAID), or a storage area network (SAN). The main difference between the primary data volume 104 and the secondary data volume 108 lies in the structure of the data stored at each location. The primary volume 104 is typically an expensive, fast, and highly available storage subsystem, whereas the secondary volume 108 is typically cost-effective, high capacity, and comparatively slow (for example, ATA/SATA disks).

Figure 1B:
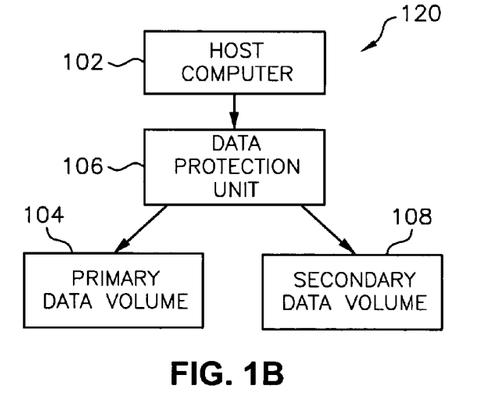

FIG. 1B shows an alternative embodiment of a system 120 constructed in accordance with the present invention. The host computer 102 is directly connected to the data protection unit 106, which manages both the primary data volume 104 and the secondary data volume 108. The system 120 may be slower than the system 100 described above, because the data protection unit 106 must manage both the primary data volume 104 and the secondary data volume 108. This results in a higher latency for writes to the primary volume 104 in the system 120 and lowers the available bandwidth for use.

Figure 1C:
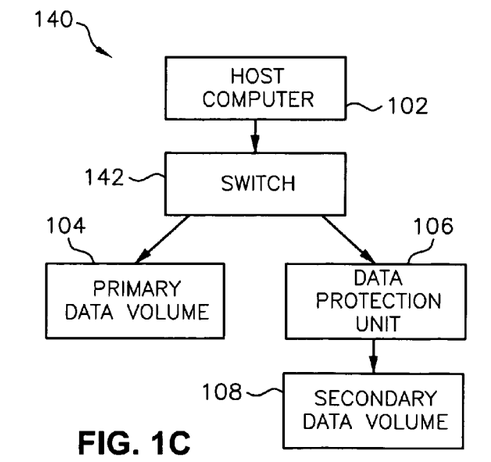

FIG. 1C shows another embodiment of a system 140 constructed in accordance with the present invention. The host computer 102 is connected to an intelligent switch 142. The switch 142 is connected to the primary data volume 104 and the data protection unit 106, which in turn manages the secondary data volume 108. The switch 142 includes the ability to host applications and contains some of the functionality of the data protection unit 106 in hardware, to assist in reducing system latency and improve bandwidth.

It is noted that the data protection unit 106 operates in the same manner, regardless of the particular construction of the protected computer system 100, 120, 140. The major difference between these deployment options is the manner and place in which a copy of each write is obtained. To those skilled in the art it is evident that other embodiments, such as the cooperation between a switch platform and an external server, are also feasible.

Figure 2:
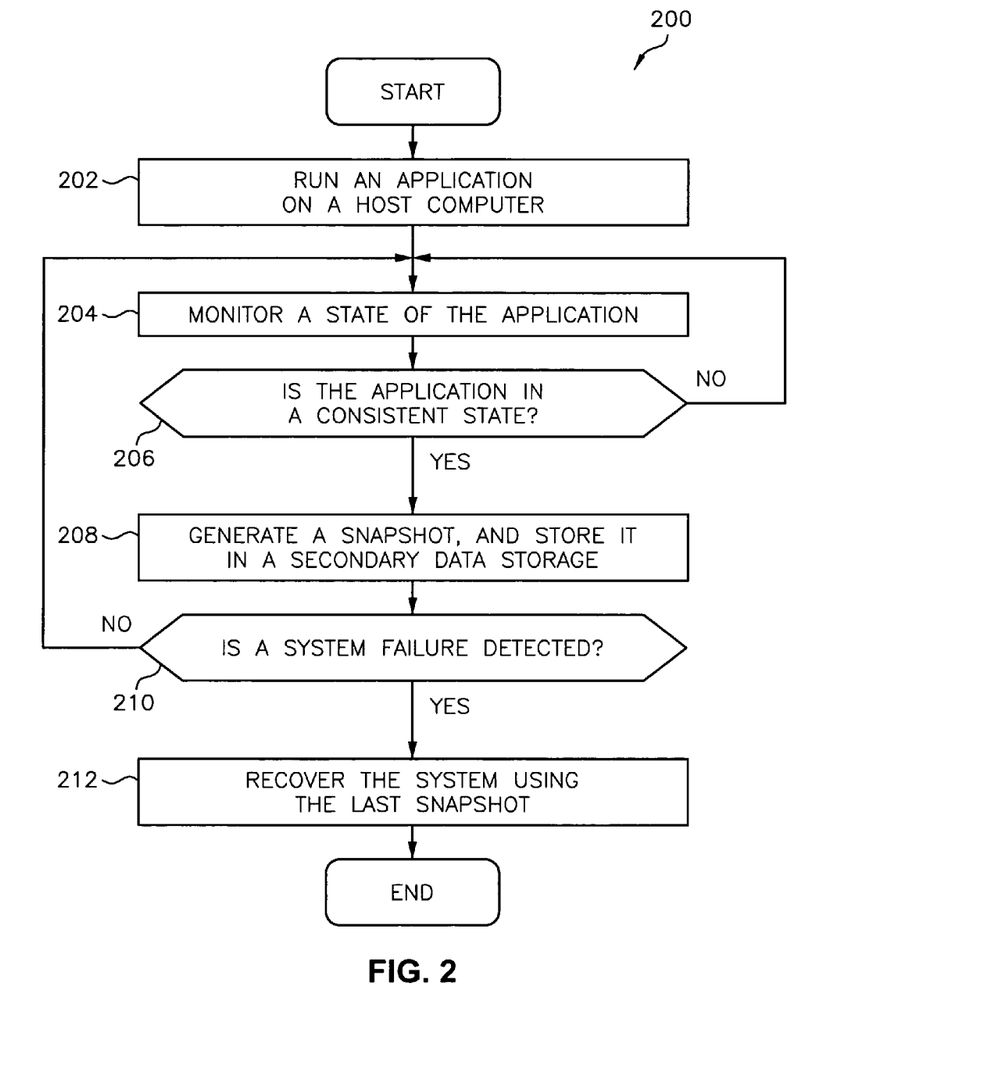
FIG. 2 is a flow diagram of a process for data backup in accordance with one embodiment of the present invention.

FIG. 2 is a flow diagram of a process 200 for data backup in accordance with one embodiment of the present invention. A host computer 102 runs an application (step 202). The output generated by the host computer 102 is preferably, but not necessarily, first stored in a memory in the host computer 102 and later flushed into a primary data volume 104. The data stored in the primary data volume 104 is backed up by a plurality of snapshots generated, periodically or non-periodically, in accordance with a snapshot generation policy. A data protection unit 106 constantly monitors whether the state of the application is consistent (step 204). The application generates information that may be used in determining the state of the application. For example, the application may generate an indicator indicating that the application is in a consistent state. The application may set specific bits to indicate that the memory has to be flushed to the data storage and no dirty buffers are outstanding. Alternatively, it is possible to analyze the log of a journaling system to find out a consistent state when the log is empty.

If the data protection unit 106 determines that the application is not in a consistent state, the process 200 returns to step 204 to monitor the state of the application (step 206). If the data protection unit 106 determines that the application is in a consistent state, which means the output temporarily stored in the memory is flushed into the primary data volume 104, the data protection unit 106 generates a snapshot and stores it in the secondary data volume 108 (step 208). If a system failure or other problem is detected at step 210, the data is restored using the last snapshot (step 212).

Figure 3:
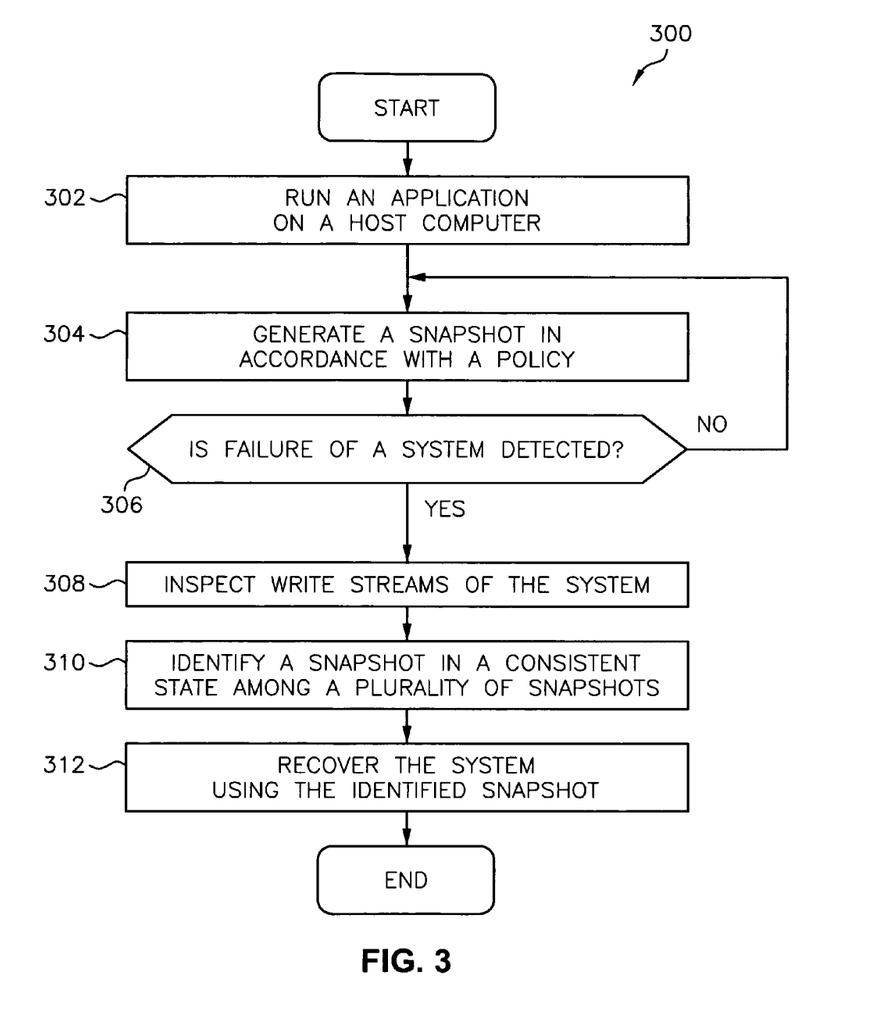
FIG. 3 is a flow diagram of a process for data backup in accordance with another embodiment of the present invention.

FIG. 3 is a flow diagram of a process 300 for data backup in accordance with another embodiment of the present invention. The present invention analyzes the log of write streams to find a consistent point to recover the data in the event of a system failure. The present invention keeps a log of every write made to the primary volume 104 (a "write log") by duplicating each write and directing the copy to the secondary volume 106. The resulting write log on the secondary volume 108 can then be played back one write at a time to recover the state of the primary volume 104 at any previous point in time.

In typical recovery scenarios, it is necessary to examine how the primary volume looked like at multiple points in time before deciding which point to recover to. For example, consider a system that was infected by a virus. In order to recover from the virus, it is necessary to examine the primary volume as it was at different points in time to find the latest recovery point where the system was not yet infected by the virus.

A host computer 102 runs an application (step 302). The output generated by the host computer 102 is first stored in a memory and later flushed into a primary data volume 104. A data protection unit 106 generates a snapshot of the data and stores the snapshot in a secondary data volume 108 (step 304). The snapshots may be generated periodically or non-periodically depending on a snapshot generation policy. If a system failure or other problem is detected at step 306, the data protection unit 106 inspects a log of previous writes. The application updates a log of writes every time it gets output to be recorded in the memory and the primary data volume 104. The data protection unit 106 replays the log of write streams and determines an exact point in time when the application was in a consistent state. The data protection unit 106 identifies a snapshot in a consistent state among a plurality of snapshots (step 310) and restores the data based on the consistent state snapshot (step 312).

The snapshot from which the system is recovered does not have to be absolutely consistent. A snapshot which is generated slightly before or after the consistent point may be utilized. Basically, a snapshot which minimizes the replay of the log is the best snapshot for recovery. The best snapshot may be different from one application to another. Alternatively, when the consistency determination is made in real-time for an application, it is necessary to use a host resident agent that reads non-persistent state information from a memory rather than only analyzing the write data stream.

Figure 4A:
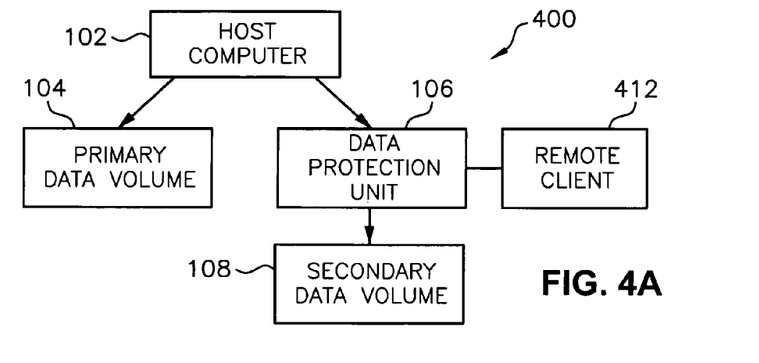
FIGS. 4A-4C are block diagrams of systems for data backup including remote client access means in accordance with another embodiment of the present invention.
Figure 4B:
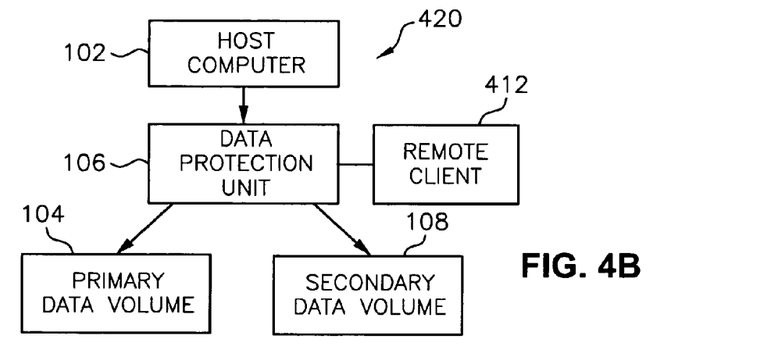
Figure 4C:
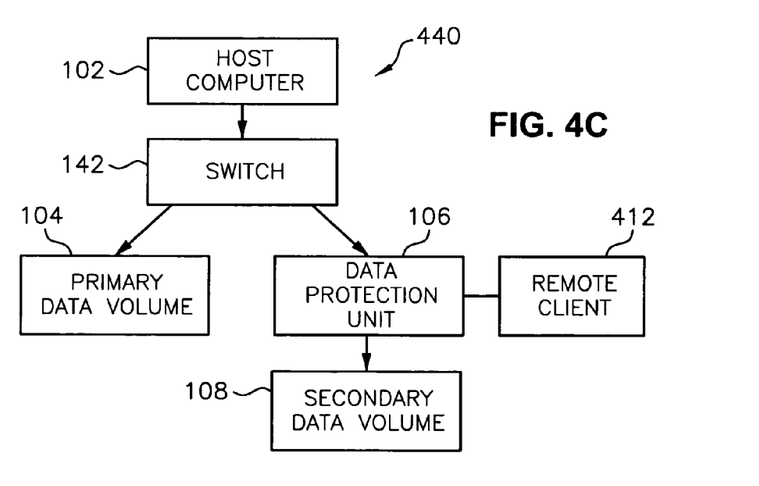

FIGS. 4A-4C are block diagrams of systems for data backup including a remote client 412 in accordance with another embodiment of the present invention. Remote client 412 is an application for providing a user means for recovering or accessing snapshots in a consistent state. The data protection unit 106 interfaces with the remote client 412 for accessing snapshots in a consistent state. Systems 400, 420, and 440 may operate in the same manner as systems 100, 120, and 140, respectively, for generating snapshots in a consistent state. In FIGS. 4A-4C, host computer 102 may be an email, ftp, web server, or any other application or service that requires backup of data. Remote client 412 is typically in a location different from host computer 102 but may also be in the same location as the host, as desired. In FIGS. 4A, 4B and 4C, the remote client 412 communicates with the data protection unit 106 for recovering snapshots in a consistent state whereby the data protection unit 106 provides internet message access protocol (IMAP), hypertext transfer protocol (HTTP), and file transfer protocol (FTP) services or an interface to such services. These services may be provided by a server operating in the data protection unit 106. Remote client 412 may be an email client, web client, i.e. web browser, ftp client, or the like. The data protection unit 106 may also provide any other application specific service for remote client access and recovery of snapshots in a consistent state, as desired.

Figure 5:
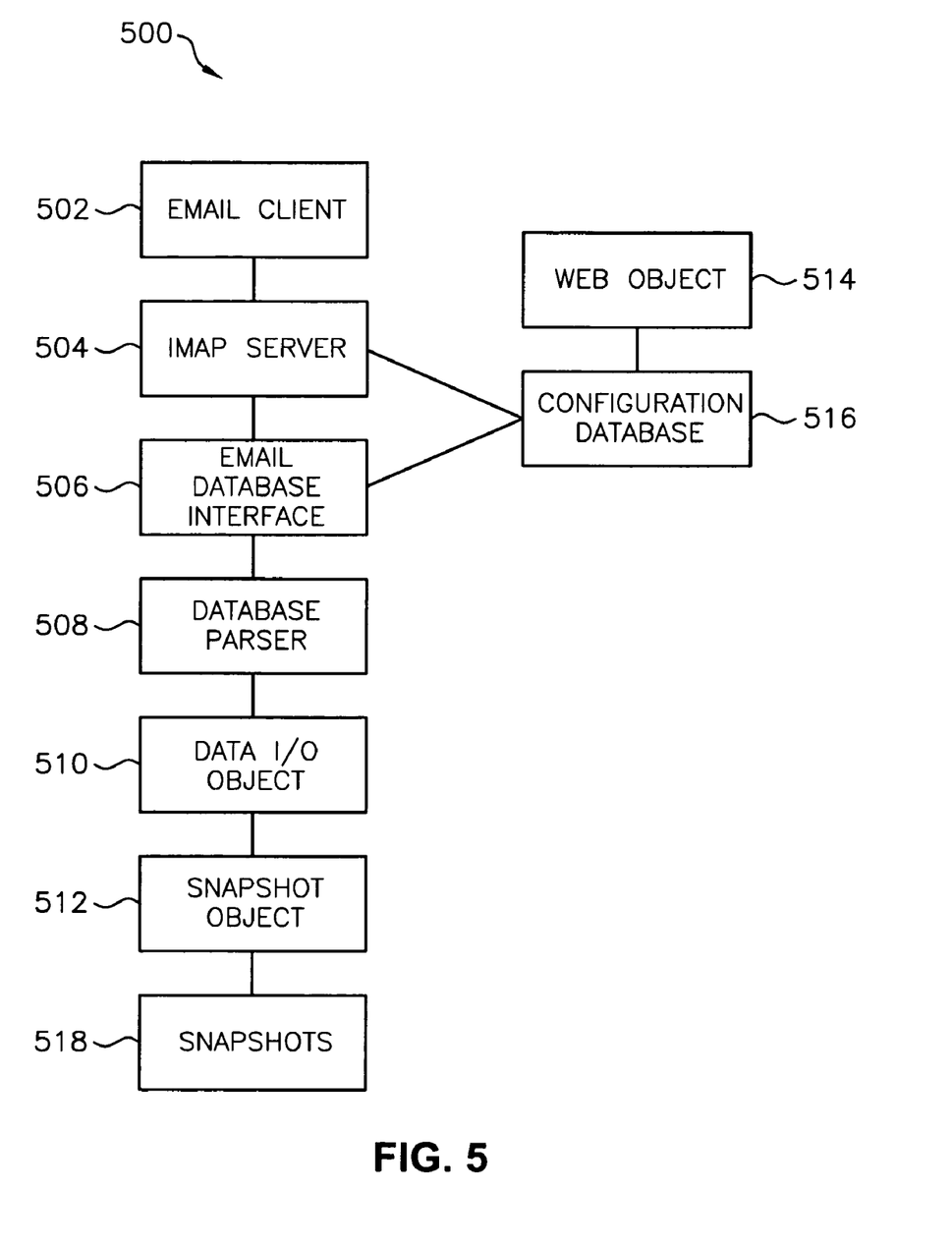
FIG. 5 is a block diagram of a system for an email client accessing a snapshot in a consistent state in accordance with another embodiment of the present invention.

FIG. 5 is a block diagram of a system 500 for an email client 502 accessing snapshots 518 in a consistent state in accordance with another embodiment of the present invention. Snapshots 518 may be stored in a physical or logical database, as desired, and an email application generates snapshots 518 in a consistent state similar to the methods described in FIGS. 2 and 3. The email client 502 communicates with IMAP server 504 using a provided internet protocol (IP) address, such as a virtual IP address. IMAP server 504 provides an interface to email client 502 for accessing email data. System 500 is transparent to the user of email client 502 such that the user may not notice when system 500 is restoring email data from the snapshots 518 in a consistent state. Email client 502 may be any software (e.g. Netscape messenger or Microsoft Outlook) that supports an IMAP interface. Email database interface 506 provides a common interface used by IMAP server 504 to access snapshots 518 having email data. Email database interface 506 may be used to store email directories and provide a list of snapshots to IMAP server 504 provided by database parser 508. The list may have one or more snapshots in a consistent state. Database parser 508 may provide this list by using a software handle or other means provided by email database interface 506.

Still referring to FIG. 5, database parser 508 parses snapshots in a consistent state 518 and provides the email data requested by the IMAP server 504 to send to email client 502 through the email database interface 506. The provided email data may be a mailbox, mail folder, email directory, individual email message, any type of email database, or the like. The database parsing will depend on the stored email data in the snapshot 518. The data I/O object 510 performs read/write requests from the physical or logical storage area where the snapshots 518 are stored. The snapshot object 512 provides the mapping between logical address and physical address of the data blocks belonging to snapshots 518. The web object 514 is used to define attributes of the email application and may also handle any other HTTP requests. The required attributes of the email application are provided to IMAP server 504 by web object 514. Configuration database 516 may provide user authentication information to the IMAP server 504 or the email database interface 506 when a request for access is made by email client 502.

Figure 6:
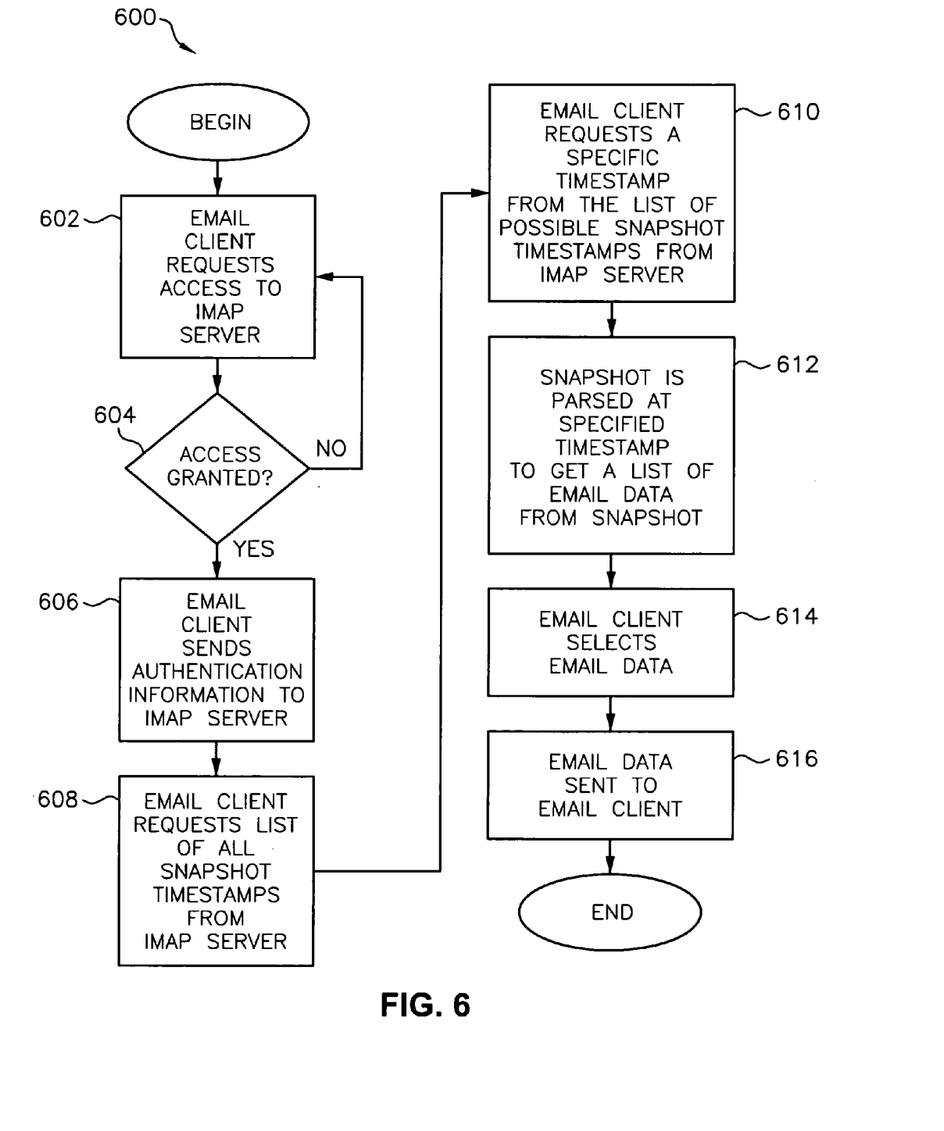
FIG. 6 is a flow diagram of a process for an email client accessing a snapshot in a consistent state in accordance with another embodiment of the present invention.

FIG. 6 is a flow diagram of a process 600 for an email client 502 accessing email data from a snapshot 518 in a consistent state using system 500 in accordance with another embodiment of the present invention. Email client 502 requests access to IMAP server 504 (step 602). If access is granted (step 604), email client 502 sends authentication information to IMAP server 504 (step 606). Email client then requests a list of all possible snapshot timestamps in a consistent state from IMAP server 504 (step 608). IMAP server 504 obtains the list of possible snapshot timestamps by invoking a request to email database interface 506. Email client 502 then requests a specific snapshot timestamp from the list provided by IMAP server 504 (step 610). The requested snapshot is then parsed at database parser 508 at the requested snapshot time to get a list of email data from the snapshot (step 612). Email client 502 selects email data from the list of email data (step 614). The selected email data is provided to email client 502 by IMAP server (step 616).

It is noted that the present invention may be implemented in a computer-readable storage medium containing a set of instructions for a processor or general purpose computer. For example, the set of instructions may include a snapshot code segment, an email recovery code segment, an email parsing code segment, and a communication code segment.

As explained above in the description of FIGS. 2 and 6, the snapshot code segment preferably monitors the state of an email application and generates a plurality of snapshots for stored email data in a primary data volume when the email application is in a consistent state. The email recovery code segment preferably provides an individual email message to an email client, wherein the email client selects one of the plurality of snapshots at a predetermined timestamp from a list of snapshots provided to the email client. The email parsing code segment preferably parses the selected snapshot for the individual email message requested by the email client, wherein the selected snapshot is parsed based on the type of email application. The communication code segment preferably communicates the individual email message to the email client.

As mentioned above, the present invention can be implemented in a computer program tangibly embodied in a computer-readable storage medium for execution by a processor or a general purpose computer; and method steps of the invention can be performed by a processor executing a program of instructions to perform functions of the invention by operating on input data and generating output data. Suitable processors include, by way of example, both general and special purpose processors. Typically, a processor will receive instructions and data from a read-only memory, a random access memory, and/or a storage device. Storage devices suitable for embodying computer program instructions and data include all forms of non-volatile memory, including by way of example semiconductor memory devices, magnetic media such as internal hard disks and removable disks, magneto-optical media, and optical media such as CD-ROM disks and digital versatile disks (DVDs). In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A method comprising:
    monitoring memory activity of an application running on a host computer having a memory, wherein the monitoring is carried out by a data protection unit physically distinct from the host computer without suspending the application, wherein the application is configured to temporarily store output data in the memory before the data is output to a primary data volume including a first aggregation of one or more physical storage devices, and wherein monitoring memory activity of the application includes monitoring to detect when the temporarily stored output data is output to the primary data volume;
    based on the memory activity, detecting when the memory contains no pending data associated with the application to be written to the primary data volume;
    in response to detecting that the memory contains no pending data, generating a snapshot of data stored in the primary data volume;
    storing the snapshot on a secondary data volume including a second aggregation of one or more physical storage devices;
    receiving a request for email data from a remote client by an internet message access protocol (IMAP) server on the data protection unit;
    providing a list of snapshots from the IMAP server to the remote client;
    receiving from the remote client a selection of a snapshot from the list of snapshots;
    parsing the selected snapshot for email data; and
    providing the email data to the remote client.

2. The method of claim 1 wherein the memory activity is determined by using an indication generated by the application.

3. The method of claim 2 wherein the indication is a bit indicating flushing of a buffer to the primary data volume.

4. The method of claim 2 wherein the indication is a state of a journaling file system log, whereby the data protection unit determines that the memory contains no pending data at a point in time when the log is empty.

5. The method of claim 1 wherein the application is an email application.

6. The method of claim 1 wherein the remote client is an email client.

7. The method of claim 1 wherein the email data is at least one of an email folder, email mailbox, email directory, individual email message, and email database.

8. A system for backing up data, the system comprising:
    a host computer having a memory and configured to run an email application;
    a primary data volume in communication with the host computer and configured to store email data, wherein the email application is configured to temporarily store output data in the memory before the data is output to the primary data volume;
    a data protection unit physically distinct from the host computer and in communication with the host computer and configured to monitor memory activity of the email application without suspending the email application, wherein monitoring memory activity of the application includes monitoring to detect when the temporarily stored output data is output to the primary data volume, and to generate a snapshot for the stored email data when the monitoring detects that the email application has no pending data to be written to the primary data volume;
    a secondary data volume in communication with the data protection unit and configured to store the snapshot; and
    an email client in communication with the data protection unit, wherein the data protection unit includes a server for interfacing between the data protection unit and the email client for recovering email data.

9. The system of claim 8 wherein the email application generates an indication of the memory activity, whereby the memory activity is determined using the indication.

10. The system of claim 9 wherein the indication is a bit indicating flushing of a buffer to the primary data volume.

11. The system of claim 9 wherein the indication is a state of a journaling file system log, whereby the data protection unit determines that the memory contains no pending data at a point in time when the log is empty.

12. The system of claim 8 wherein the data protection unit controls both the primary data volume and the secondary data volume.

13. The system of claim 8 further comprising a switch for coupling the primary data volume and the data protection unit to the host computer.

14. The system of claim 8 further comprising:
an email database interface in communication with the server;
a database parser in communication with the email database interface;
a plurality of snapshots stored in a database, the database in communication with the database parser, wherein the email client selects one of the plurality of snapshots at a predetermined timestamp from a list of snapshots requested by the email client; and
wherein the selected snapshot is parsed by the database parser for email data requested by the email client and the requested email data is provided to the email client by the server.

15. The system of claim 14 wherein the email data is parsed by the database parser based on the type of email data.

16. The system of claim 8 wherein the email data is at least one of an email folder, email mailbox, email directory, individual email message, and email database.

17. A method for backing up data and recovering email data, the method comprising:
running an application on a host computer having a memory, wherein the application is configured to temporarily store output data in the memory before the data is output to a primary data volume including a first aggregation of one or more physical storage devices;
generating a plurality of snapshots of data stored in the primary data volume, wherein the plurality of snapshots are generated by a data protection unit physically distinct from the host computer without suspending the application;
storing the plurality of snapshots on a secondary volume including a second aggregation of one or more physical storage devices;
identifying a snapshot among the plurality of snapshots, wherein identifying the snapshot includes determining when the temporarily stored output data was output to the primary data volume and wherein the identified snapshot is determined to have been generated when the memory had no pending data to be written to the primary data volume;
requesting email data from an internet message access protocol (IMAP) server on the data protection unit by a remote client;
parsing the identified snapshot for email data; and
providing the email data to the remote client.

18. The method of claim 17 wherein the identified snapshot is determined by inspecting a log of write streams.

19. The method of claim 17 wherein the application is an email application.

20. The method of claim 17 wherein the email data is at least one of an email folder, email mailbox, email directory, individual email message, and email database.

21. A computer-readable storage medium storing a set of instructions for execution by a general purpose computer, the set of instructions comprising:
a snapshot code segment for monitoring memory activity of an email application running on a host computer having a memory, wherein the application is configured to temporarily store output data in the memory before the data is output to a primary data volume including a first aggregation of one or more physical storage devices, and wherein monitoring memory activity of the application comprises monitoring to detect when the temporarily stored output data is output to the primary data volume, wherein the monitoring is carried out by a data protection unit physically distinct from the host computer without suspending the email application and generating a plurality of snapshots for stored email data in the primary data volume when the monitoring indicates that the email application has no pending data to be written to the primary data volume;
an email recovery code segment for providing an individual email message to an email client, wherein the email client selects one of the plurality of snapshots at a predetermined timestamp from a list of snapshots provided to the email client;
an email parsing code segment for parsing the selected snapshot for the individual email message requested by the email client, wherein the selected snapshot is parsed based on the type of email application; and
a communication code segment for communicating the individual email message to the email client.

\* \* \* \* \*